Patented Jan. 31, 1939

2,145,815

UNITED STATES PATENT OFFICE 2,145,815

ZINC SULPHIDE PIGMENT

Donald G. Morrow, Wilmington, Del., assignor to Hercules Powder Company, Wilmington, Del., a corporation of Delaware No Drawing. Application March 17, 1937, Serial No. 131,405

14 Claims. (Cl. 23—135)

This invention relates to a method for the production of zinc sulphide pigment and to the product and intermediate product thereof.

This application is a continuation in part of my copending application, Ser. No. 22,583, filed May 21, 1935.

The process of this invention involves the precipitation of zinc sulphide, as by means of hydrogen sulphide, from an amino-zinc salt solution; and such procedure possesses valuable technical and commercial advantages, but commercial zinc sulphide pigment has not heretofore been produced by any process involving such procedure. Commercial zinc sulphide pigment now and heretofore available has been precipitated from an acid solution and numerous difficulties in that procedure and deficiencies in the product thereof are avoided in the practice of this invention.

White pigments must possess such physical characteristics that they will meet very exacting requirements and the process and product of this invention are such that the zinc sulphide pigment thereof possesses superior color or whiteness, superior color- or tinting-strength, high hiding power, inherent resistance to the darkening action of light and especially the ultra violet rays thereof, unusual and advantageous alkalinity, dispersability in either water or oil without special surface treatment, superior chemical purity, superior behavior when embodied in paint having an oil or varnish vehicle, and other valuable properties. Certain of these properties are due to the suitability and uniformity of the particle size, the purity, and the dispersability of the final product which result from the advantageous features of the process. Advantages of the process are that the zinc sulphide precipitate requires no "end pointing" or alkalizing, requires no aging, is readily filterable, is of such uniform and suitable particle size and possesses such content of ammonia that it is valuable as a corrosion resistant primer without calcining and milling and is especially suited to calcining without oxidation to produce the superior final product, is readily washable, produces a coherent filter cake that is not slimy nor impervious nor chalky, and calcines to produce a readily millable product that is not hard nor horn-like but yields a final product having the above-mentioned properties; the solution from which the precipitate is formed carries a high concentration of zinc and the size of the equipment is thereby minimized; the high concentration of zinc and the conditions promoting solution of hydrogen sulphide result in a rapidity of precipitation that greatly reduces the time involved and minimizes the possibility of producing a chalky precipitate that makes calcining difficult and leads to a yellow calcined product of low hiding-power; the alkalinity of the solution eliminates deterioration of equipment and contamination of materials therein; the general procedure, especially in the co-ordination of such factors as the concentration of ammonia and zinc in the solution, the temperature and agitation of the solution, the concentration of the hydrogen sulphide in the gas, and the time of the precipitation, is such that it produces with simplicity and certainty the superior final product of the invention and the precipitate having the properties above mentioned; and the by-products, ammonia salts, are valuable and in readily recoverable form. Moreover, the requirements in respect of the hydrogen sulphide gas are such that cheap supplies may be used, and the requirements in respect of the zinc are such that zinc skimmings from galvanizing plants and zinciferous flue dusts from secondary copper blast furnaces may readily be employed in the production of zinc salt solution.

In the practice of this invention the precipitate is recovered from the solution by filtration, washed, dried, calcined, quenched, milled, dried and disintegrated to produce the final zinc sulphide pigment of the invention. However, the intermediate product, consisting of the washed precipitate, after drying and milling, if necessary, is a valuable product both as being especially well suited to the subsequent steps for the production of a final zinc sulphide pigment and as a pigment in priming coats. This intermediate product has uniform and suitable particle size and contains a high proportion, 2.0% to 2.5%, of ammonia even though dried to a constant weight at 120° C. These properties cause the intermediate uncalcined product to inhibit corrosion and to possess hiding-power sufficient for a priming coat and about equal to that of zinc oxide, and tinting strength substantially equal to that of lithopone.

Other and further advantages and features of this invention will appear from the following description of an illustrative operation of the process and from the description of the intermediate and final products thereof.

The solution from which the crude zinc sulphide is precipitated is a purified zinc salt solution in which the salt is preferably a nitrate but may be a sulphate or chloride. The solution should be substantially free of elements, other than Ni, which form insoluble sulphides, e. g., Mn, Cu, Cd, Pb, Fe, Sn, Sb, As, etc., but it may contain Ni, Mg, Ca, Na and K because only Ni may form an insoluble sulphide and the conditions maintained in the operation of the process prevent that from being precipitated although in the acid process any Ni would be quantitatively precipitated and impair the light resistance and perhaps the permanent color of the resulting zinc sulphide. Preferably the zinc is in the form of an ammino zinc salt such as ammino-zinc nitrate $Zn(NH_3)_4(NO_3)_2$. It is usually in that form as a result of the operations involved in the preparation and purification of the solution, but in any event, the solution is saturated with ammonia before precipitation is started. The solution preferably has a zinc concentration of about 160 grams to 200 grams of Zn per liter, and preferably about 180 grams of zinc per liter. Below that range close adjustment of other factors is necessary to obtain a calcined product sufficiently free of yellow color, although an analysis of such a yellow product does not indicate that that color is due to the presence of zinc oxide. Concentrations above 200 grams of Zn per liter cause the resulting slurry to be too thick for the dispersion of gas therein, and may lead to a yellow color in the calcined product possibly due to the presence of undesirable zinc compounds formed because the thickness of the slurry prevented complete reaction.

At all times during the precipitating step the temperature is maintained at about 50° C. to 80° C. and preferably in the neighborhood of 70° C. by such addition or removal of heat as may be necessary, the reaction being exothermic. At temperatures below about 50° C. the precipitate tends to be too fine for efficient (rapid and complete) filtration and washing. At temperatures above about 80° C. the solution holds too little ammonia in solution, with the consequences hereinafter set out. The relatively high temperature employed prevents the absorption in the solution of $CO_2$ or HCN that may be in the gas fed thereto and therefore minimizes the formation of carbonates and cyanides. Such temperature facilitates the attainment of advantageous particle size in the precipitate.

To the solution having the properties and being in the condition above stated, ammonia gas is supplied below the surface in such quantity and at such time or times as not only to insure saturation of the solution by ammonia prior to the addition of hydrogen sulphide but to insure, throughout the precipitation step, high ammonia concentration or saturation or even an excess, in spite of the relatively high temperature of the solution and the "sweeping-out" tendency by other gases. Ordinarily ammonia will be so supplied throughout the precipitation to maintain this condition.

To the solution, saturated with ammonia, hydrogen sulphide gas is fed below the surface thereof, preferably accompanied by carbon dioxide gas, or other suitable diluent gas. Ordinarily ½ to 1 volume of ammonia is fed to the solution during precipitation for each volume of $H_2S$. The mixture of $H_2S$ and $CO_2$, or other diluent gas, preferably contains 25% or more of $H_2S$, 75% of $H_2S$ having been found to be highly effective, and 100% of $H_2S$ having been found to produce a lack of brightness or dullness in the paint in which the pigment is embodied. If the percentage of $CO_2$, or other diluent gas, is more than 50% of the mixture it may be desirable to increase the proportion of ammonia above the range stated to compensate for that swept out by the diluent gas and so maintain high concentration or saturation of the solution by ammonia.

Maintaining the temperature of the solution as above stated, the solution is agitated sufficiently to prevent settling of the precipitate to the bottom of the vessel, but the agitation is not so intense as to give a highly hydrated fine precipitate that is too fine to filter and horny when dried. Insufficient agitation causes the calcined product to have a yellow color presumably due to incomplete reaction upon solution entrapped in settled precipitate. Thus, although higher solution temperatures require special precautions to maintain proper ammonia content in the solution, it is only by maintaining such higher temperatures which tend to produce a coarser precipitate that it is possible to employ sufficient agitation to prevent undesirable yellowness of the product.

The gas employed should be freed of tar and organic compounds of all classes and preferably all cyanides and carbon bisulphide.

The maintaining of saturation of the solution by ammonia is highly important in the attainment of the advantages of the invention. If not maintained, the precipitate will either be so fine and slimy as to prevent filtration and washing or will give a slimy cake that becomes horn-like, hard and translucent upon drying and cannot be calcined or milled to produce a pigment. Since the ammonia supply must be at a rate sufficient to maintain high concentration or saturation, in spite of the relatively high temperature of the solution and in spite of the "sweeping-out" action of other gases fed to the solution, and especially diluent gas, the advantages of the invention cannot be achieved by the use of coke oven gas as a supply of hydrogen sulphide because those gases contain only about 0.5% by volume of $H_2S$ and less 1% of $NH_3$, and the feeding of enough gas to provide the necessary $H_2S$ results in the sweeping out of the solution, when at its proper temperature, all $NH_3$ except such small percentage as might remain present as a result of reaching equilibrium with the coke oven gas which contains such a low percentage of $NH_3$. Moreover, coke oven gas could not be sufficiently freed economically of all organic compounds to give white pigment. Saturation or high concentration of $NH_3$ in the solution, in spite of the relatively high temperature thereof, prevents co-precipitation of $Zn(OH)_2$ (and basic zinc salts in general, e. g., basic zinc carbonate), whereas precipitation thereof is promoted in the presence of a small amount of ammonia, the presence of zinc hydroxide or such basic zinc salts in the precipitate causing it to be fine and causing the filter cake to be slimy and incapable of being efficiently washed. This causes the dried filter cake to be horn-like and incapable of being converted into suitable pigment by calcination and milling. Moreover, the zinc hydroxide or basic zinc salts would appear in the calcined product as zinc oxide and would impart yellow color to the pigment. Saturation by, or excess of, ammonia in the solution at such temperature as gives a proper rate of precipitation and proper coarseness of precipitate also prevents zinc cyanide and zinc carbonate from forming, although zinc carbonate could form in the absence of such quantity of ammonia at the temperature employed. This is important because zinc carbonate and zinc cyanide cannot be converted completely to sulphides unless an excess of H₂S be used and such excess is avoided in the invention. Although the use of the relatively high temperature necessitates continual and ample supply of ammonia, it opposes the formation of ammonium carbonate that would clog the system and use up ammonia.

A very important advantage of the high concentration of ammonia is that it facilitates the absorption of hydrogen sulphide, which usually does not escape from the surface of the solution, it being possible that the sulphur is passed to the zinc through an ammonium sulphide stage.

Care is taken to avoid the introduction of an excess of hydrogen sulphide, as by applying some of the slurry to lead acetate indicator paper to observe any soluble sulphide ion. Avoidance of such excess is important to the avoidance of polysulphides of ammonia, and perhaps of zinc. The polysulphides of ammonia, although soluble, do not appear to wash out of the precipitate and all polysulphides impart yellow color to the pigment. Moreover, in the recovery of by-product ammonia salts the removal of sulphur is troublesome.

Due to the conditions above described, the precipitation is rapid and is usually complete in one to two hours. Such failure to maintain the conditions above described as leads to a precipitation time of four or more hours results in definite degradation of the product, and the filter cake becomes chalky and disintegrates into powder in preparing it for and passing it through the calcining operation, and a yellow product results even though analysis may not show unusually high oxygen content, and, also, the final product lacks tinting strength because of non-uniformity and excessive range of particle size.

By maintaining conditions as above described the precipitation of zinc is quantitative and the final pigment will comprise more than 99% zinc sulphide. As contrasted with this advantage, precipitation from an acid solution, as in the Myhren et al. Patent No. 2,020,902, requires that the solution be relatively dilute, containing about 30 grams Zn per liter, to prevent solution of zinc sulphide in the resulting acid and even then the slurry contains as much as 1.5 gr. per liter of unprecipitated Zn (5% of the original zinc) and 4.5% of sulphuric acid. The recovery of values from such mother liquor presents great difficulties. Attempts to avoid such difficulties and increase precipitation of zinc sulphide by addition of barium sulphide have been ineffectual because it has been impossible so to decrease the acidity to any substantial extent and produce pigment that is within the specification of 97% ZnS content for zinc sulphide pigment. In the acid process, as in Stutz et al., No. 2,020,918, "end pointing" of the precipitate, consisting in repulping the washed pigment and adding alkaline compounds, such as barium or calcium hydroxide, has to be applied to the precipitate to render it alkaline, and further contamination of the product results.

In the precipitation of zinc sulphide from an acid solution, aging for as much as 18 or more hours at about 60° C. or higher is necessary to achieve such particle size as will facilitate filtering and washing and produce a useful product. But, in the practice of this invention, having maintained the conditions above described, the precipitate is in such physical form that it may at once be separated by filtration and readily washed to a content of less than 0.2% of ammonia salts and will produce a coherent filter cake that will not disintegrate into dust or become horn-like and useless when dried. When salts in the solution are nitrates, advantages are that they have higher solubility than other salts and are therefore more readily kept in solution and washed from the precipitate, and such residue of salts as remains in the filter cake exerts in the calcining a slight oxidizing effect that removes any carbon due to the presence of traces of organic matter. The zinc sulphide in the washed filter cake contains 2.0 to 2.5% of ammonia which is not washed out and which is not removed in drying the cake to constant weight at 120° C. The zinc sulphide in the dried cake constitutes the valuable intermediate product of this invention, and it not only constitutes a material that is especially suitable for subsequent treatment for production of the final zinc sulphide pigment of this invention, but constitutes a material which, due to its content of ammonia, its corrosion-inhibiting power, its uniform and suitable particle size and its covering power, is highly valuable as an ingredient of a priming paint. This intermediate product is dried, usually in the atmosphere at about 100° C. If used as a primer pigment it is dried to a point at which it contains substantially no free moisture and disintegrated. If passed on to calcination it is advantageously dried to a moisture content of 15% to 20%.

To produce zinc sulphide pigment in its final form from the partly dried filter cake (containing about 15% of water), the cake is broken into small particles having an average dimension of about ¼", calcined at 650°–780° C. in an inert atmosphere such as superheated steam in the usual manner to drive off free water and water of hydration and ammonia, and to expand the particles to such size that they effect that dispersion of light which gives the pigment hiding or covering power, quenched in water, milled in a ball mill, dried, and disintegrated, as in a cage mill, into dry pigment.

The zinc sulphide pigment of this invention possesses distinctive properties.

The product, free of cobalt, possesses light resistance (resistance to darkening when subjected to light while wet) equal to or better than the light resistance possessed by present commercial zinc sulphide pigment that contains cobalt, in accordance with the teaching of the Jantsch and Wollski Patent No. 1,693,902, for the improvement of the light resistance thereof. The product possesses such light resistance, in spite of the fact that it may contain as much as 0.4% or more of chlorine by reason of having been produced from zinc chloride salt. The quality or superiority of the light resistance of this product over the light resistance of the commercial zinc sulphide pigment was proved by the Breyer, Nelson & Farber method described in "Physical and Chemical Examination of Paints, Varnishes, Lacquers and Colors" by H. A. Gardner, 7th Edition, 1935, page 226, using as a vehicle dammar-turpentine mixture or linseed oil. The reason for this advantageous property cannot be wholly explained. It may be due to the fact that the product of this invention possesses such chemical purity (more than 99% zinc sulphide, dry basis) that the impurity thereof can only be determined by spectroscopic analysis. In contrast the A. S. T. M. Standard of 1936, No. D386–86 for pure zinc sulphide pigment is only 97% ZnS.

The finished pigment is possessed of an inherent alkalinity such that a slurry of the pigment in water gives a pH value in the range 8.0 to 10.0. This inherent alkalinity in conjunction with the high (more than 99% on a dry basis) content of ZnS is unique and in sharp contrast with the product precipitated from an acid solution especially after "end-pointing" thereof above mentioned, and in sharp contrast with present commercial pure zinc sulphide pigment. It being economically impossible to avoid some occurrence of ZnO in the calcined final product in commercial operation of the process of this invention, it is significant that the content of ZnS plus ZnO (dry basis) of the product of this invention when the process is operated with intelligent care is as high as 99.9% and it still has the alkalinity above mentioned.

The high purity of the finished calcined and milled zinc sulphide pigment is indicated by the following values, in percent on the zinc, obtained by spectroscopic analysis of several samples of the finished pigment:

| | |
|---|---|
| Co | not identifiable |
| Na | .0005 to .0010% |
| K | not identifiable |
| Li | not identifiable |
| Ca | .0015% |
| Mg | .001 to .006% |
| Ba | not identifiable |
| Cu | .0006 to .0016% |
| Cd | .0005 to .0010% |
| Pd | .0005% |
| Mn | not identifiable to .0010% |
| Fe | .0010 to .0030% |
| Al | .0005 to .0020% |
| Ni | .0003 to .0005% |
| Total metals other than Zn | .0074 to .0146% |
| Total alkali and alkali earth metals | .0030 to .0085% |

The indication "not identifiable" means that the characteristic line or lines could not be identified on the spectroscope.

The foregoing values indicate a zinc purity of 99.9926% to 99.9854%.

The desirable alkalinity of the pigment of this invention, pH 8 to 9, is remarkable in view of the low content of alkali and alkali earth metals, and is possibly due to the presence of ammonia throughout the precipitation, the high ammonia content of the precipitate, the nature of the association of that ammonia with the precipitate, and the presence of that ammonia during the calcining operation. The low content of alkali and alkali earth metals, especially barium and calcium, is due to the complete omission of "end pointing" of the precipitate. The absence of cobalt is due to the superior light resistance of the pigment which eliminates the necessity for adding cobalt. The low content of aluminum and sodium is due to the high whiteness of the product which eliminates or minimizes the necessity for adding ultramarine blue.

The product has high tinting strength as compared to commercial zinc sulphide pigment. Three grams of the product of this invention gave no darker final shade when mixed with 0.3 gram of ultramarine blue than did three and one-half grams of "Cryptone ZS—20" which is marketed as pure zinc sulphide pigment.

The product has superior dispersability characteristics. When the product is utilized in enamel having a varnish vehicle the leveling or disappearance of brush marks is almost complete, whereas the same quantity of commercial pigment in the same quantity of the same varnish leaves definite brush marks. It is important that the pigment is dispersable in either oil or water and can be used in kalsomine and casein coating compounds without the surface treatment (e. g. soap) necessary in connection with commercial zinc sulphide pigments. The product has such whiteness and brightness that its color can be made to match the artificial blue-whiteness of commercial zinc sulphide pigment that is due to addition of ultramarine blue, by adding so little ultramarine blue that the brightness is not seriously lowered and remains substantially above that of standard commercial zinc sulphide pigment. There is no test for the demonstration of this property that is as good as using the unaided eye in the comparison of samples of pigment worked out in the same vehicle and smeared on one surface of glass and compared through the other surface of the glass.

The solution from which the zinc sulphide is precipitated contains substantial quantities of free ammonia. To recover the same, the filtrate from the zinc sulphide is passed through an ammonia stripping column, where the solution is heated and the ammonia is driven off and recovered in any suitable manner, e. g., by solution in zinc nitrate solution, by neutralization with sulphuric acid to form ammonium sulphate, etc. The stripped solution then comprises a concentrated solution of ammonium nitrate, which is simply evaporated and crystallized to produce solid ammonium nitrate, suitable for use in the manufacture of explosives, etc. The dilute sulphuric acid by-product of precipitation from an acid solution is practically valueless.

The zinc salt in the solution from which the precipitate is formed may be a sulphate or a chloride instead of being a nitrate, but when the salt is a chloride the washing of the filter cake to reduce the salt content thereof should be carried out by using ammonium hydroxide for at least the first washing. This is because the filter cake obtained from the solution of chloride contains some zinc salts which are soluble in the presence of ammonia, but if the ammonia is washed out by washing with water, these salts precipitate as zinc oxychlorides which impair the light resistance of the pigment. By washing the filter cake with ammonium hydroxide precipitation of these salts as oxychlorides is avoided and they are washed out and the superior light resistance of the product is assured.

From the foregoing it will be apparent that the process of this invention effects the production of pure and valuable zinc sulphide pigment and that the process is simple and effective in that the precipitation of cyanides, basic zinc carbonates and polysulphides and other troublesome compounds is prevented and the precipitate is in handleable form and pure, and especially is in a form in which it may be used at once with great advantage or converted to a final pigment form by calcining and milling, the high content of adsorbed ammonia contributing to the superior qualities of the intermediate product, cooperating in the calcining to protect and improved the calcined product, and causing the final product to be alkaline but uncontaminated.

I claim:

1. In a method for the production of zinc sulphide pigment wherein zinc sulphide is precipitated from zinc salt solution by gas containing hydrogen sulphide, the steps comprising precipitating the zinc sulphide from a solution initially containing approximately 160 grams to approximately 200 grams of Zn per liter and maintaining such concentration of ammonia therein as will prevent substantial precipitation of zinc hydroxide and produce a readily filterable precipitate.

2. In a method for the production of zinc sulphide pigment wherein zinc sulphide is precipitated from ammino zinc salt solution by gas containing hydrogen sulphide, the steps comprising precipitating the zinc sulphide from a solution initially containing approximately 160 grams to approximately 200 grams of Zn per liter, while maintaining such concentration of ammonia therein as will present substantial precipitation of zinc hydroxide and subjecting the solution to such agitation as will prevent substantial settling of the zinc sulphide precipitate.

3. An intermediate product in the production og zinc sulphide pigment by precipitation from an ammino-zonic salt solution, comprising substantially white uncalcined dried zinc sulphide precipitate containing 2.0% to 2.5% of ammonia.

4. In a method for the production of zinc sulphide pigment wherein zinc sulphide is precipitated from ammino-zinc salt solution by gas containing hydrogen sulphide, the steps comprising precipitating the zinc sulphide from a solution initially containing approximately 160 grams to approximately 200 grams of Zn per liter while maintaining the solution at a temperature of about 50° C. to 80° C. and while maintaining such concentration of ammonia therein as will prevent substantial precipitation of zinc hydroxide, and subjecting said solution during precipitation to such agitation as will prevent substantial settling of the precipitate and produce uniform particle size of the zinc sulphide precipitate.

5. In a method for the production of zinc sulphide pigment the step comprising, precipitating zinc sulphide from an ammino-zinc salt solution with a gas containing hydrogen sulphide while maintaining in said solution during precipitation such concentration of ammonia as will prevent substantial precipitation of zinc hydroxide therein.

6. In a method for the production of zinc sulphide pigment the step comprising, precipitating zinc sulphide from an ammino-zinc salt solution with a gas containing hydrogen sulphide while maintaining said solution substantially saturated with ammonia substantially throughout the precipitation of said zinc sulphide.

7. In a method for the production of zinc sulphide pigment the steps comprising, substantially saturating an ammino-zinc salt solution with ammonia, and precipitating zinc sulphide from said ammonia saturated solution with a gas containing hydrogen sulphide while maintaining substantial ammonia saturation in the said solution throughout the precipitation of said zinc sulphide.

8. The method of claim 6 in which the ammino-zinc salt solution is maintained at a temperature of about 50° C. to 80° C. throughout the precipitation of said zinc sulphide.

9. The method of claim 5 in which the ammino-zinc salt solution throughout the precipitation step is subjected to such mild agitation as will prevent substantial settling of the zinc sulphide precipitate, prevent a highly hydrated fine precipitate that is too fine to filter and horny when dried and prevent entrapping of unreacted solution in settled precipitate.

10. The method of claim 5 in which the ammino-zinc salt solution is maintained at a temperature of about 50° C. to 80° C. throughout the precipitation of said zinc sulphide.

11. In a method for the production of zinc sulphide pigment the steps comprising, precipitating zinc sulphide from an ammino-zinc salt solution with a gas containing hydrogen sulphide while maintaining such concentration of ammonia in said solution as will prevent substantial precipitation of zinc hydroxide and maintaining the said solution at a temperature of about 50° C. to 80° C., and agitating said solution during the precipitation to prevent substantial settling of the zinc sulphide precipitate.

12. In a method for the production of zinc sulphide pigment the steps comprising precipitating zinc sulphide from an ammino-zinc salt solution with a gas containing hydrogen sulphide while maintaining in said solution during precipitation such concentration of ammonia as that the zinc sulphide precipitated will contain 2.0% to 2.5% of adsorbed ammonia that is not removable by washing and drying, washing and drying the precipitate, and calcining the dried precipitate that contains substantially all of said ammonia.

13. The method of claim 5 in which the zinc sulphide is precipitated from an ammino-zinc chloride solution followed by the step of washing the zinc sulphide so precipitated in the presence of ammonia.

14. The method of claim 5 in which the zinc sulphide is precipitated from an ammino-zinc nitrate solution, and the additional step of agitating the said solution during the precipitation to prevent substantially settling of the zinc sulphide precipitate, to prevent a highly hydrated fine zinc sulphide precipitate that is too fine to filter and horny when dried, and to prevent entrapping of unreacted solution in settled zinc sulphide precipitate.

DONALD G. MORROW.

CERTIFICATE OF CORRECTION.

Patent No. 2,145,815. January 31, 1939.

DONALD G. MORROW.

It is hereby certified that error appears in the printed specification of the above numbered patent requiring correction as follows: Page 2, second column, line 44, after "less" insert than; page 3, second column, line 74, for "D386-86" read D386-36; page 5, first column, line 16, claim 2, for the word "present" read prevent; line 21, claim 3, for "og" read of; and line 22, same claim, for "ammino-zonic" read ammino-zinc; same page, second column, line 54, claim 14, for the word "substantially" read substantial; and that the said Letters Patent should be read with this correction therein that the same may conform to the record of the case in the Patent Office.

Signed and sealed this 4th day of April, A. D. 1939.

(Seal)

Henry Van Arsdale
Acting Commissioner of Patents.